United States Patent
Rodriguez et al.

(10) Patent No.: US 9,959,415 B1
(45) Date of Patent: May 1, 2018

(54) METHODS AND SYSTEMS FOR ACCESSING DATA FROM DIFFERENT SECURITY DOMAINS

(75) Inventors: Ismael Rodriguez, Colorado Springs, CO (US); Ross Wilson, Erie, CO (US); Ricardo Torres, Colorado Springs, CO (US); Michael C. Kline, Huntsville, AL (US); Eric Irwin, Peyton, CO (US)

(73) Assignee: The Boeing Company, Chicago, IL (US)

( * ) Notice: Subject to any disclaimer, the term of this patent is extended or adjusted under 35 U.S.C. 154(b) by 1799 days.

(21) Appl. No.: 12/971,760

(22) Filed: Dec. 17, 2010

(51) Int. Cl.
*G06F 21/10* (2013.01)
*G06F 21/60* (2013.01)
*H04L 29/06* (2006.01)

(52) U.S. Cl.
CPC ............ *G06F 21/606* (2013.01); *G06F 21/10* (2013.01); *H04L 63/10* (2013.01); *H04L 63/126* (2013.01)

(58) Field of Classification Search
CPC ....... H04L 63/126; G06F 21/10; G06F 21/606
USPC .................................................. 726/27, 30, 1
See application file for complete search history.

(56) References Cited

U.S. PATENT DOCUMENTS

| | | | |
|---|---|---|---|
| 8,510,818 B2 * | 8/2013 | Garg et al. ................. 726/9 |
| 2007/0256083 A1 * | 11/2007 | Vayssiere ................. 719/320 |
| 2007/0271212 A1 * | 11/2007 | Jones et al. ................. 707/1 |
| 2009/0193057 A1 * | 7/2009 | Maes ................. 707/200 |
| 2010/0009696 A1 * | 1/2010 | Fok et al. ................. 455/456.1 |
| 2010/0049687 A1 * | 2/2010 | Patten et al. ................. 706/47 |
| 2010/0169406 A1 * | 7/2010 | Gregg ................. 709/203 |
| 2012/0036581 A1 * | 2/2012 | Maximilien et al. ........... 726/26 |

FOREIGN PATENT DOCUMENTS

WO   WO 2010063768 A1 *   6/2010

OTHER PUBLICATIONS

Wikipedia, Mashup (web application hybrid), Wikipedia, The Free Encyclopedia, Dec. 11, 2010, Page Version ID: 401811842, 6 pages.
Wikipedia, Cross Domain Solutions, Wikipedia, The Free Encyclopedia, Oct. 7, 2010, Page Version ID: 389395193, 3 pages.

* cited by examiner

*Primary Examiner* — Mary Li
(74) *Attorney, Agent, or Firm* — Armstrong Teasdale LLP

(57) ABSTRACT

Methods and apparatus for use in presenting information from a plurality of security domains. A first request for first data from a first data source and a second request for second data from a second data source are transmitted by a computing device. The first data source is associated with a first security domain, and the second data source is associated with a second security domain. A bridge computing device forwards the first request and/or the second request based on determining that the requests are authorized. The first data and the second data may be received and combined by the computing device.

20 Claims, 6 Drawing Sheets

METHODS AND SYSTEMS FOR ACCESSING DATA FROM DIFFERENT SECURITY DOMAINS

BACKGROUND

The field of the disclosure relates generally to accessing data from multiple sources and, more specifically, to methods and systems for providing a visualization of data obtained from computing devices associated with different security classifications.

At least some known computer systems allow data from multiple sources to be combined into a single display. Such a combination may be colloquially referred to as "mashup". However, known mashup systems access data from sources associated with a single security classification. For example, such mashup systems generally retrieve data from publicly available data sources that are accessible via the Internet.

Some users may benefit from the ability to combine data from data sources associated with different security classifications. However, such data sources cannot simply be exposed to indiscriminate access without compromising the security provided by the different security classifications.

BRIEF DESCRIPTION

In one aspect, a method for presenting information from a plurality of security domains is provided. The method includes receiving by a computing device a first communication component provided by a first server in a first security domain that is associated with a first security classification. A second communication component is received by the computing device. The second communication component is provided by a second server in a second security domain that is associated with a second security classification. First data received from the first network via the first communication component and second data received from the second network via the second communication component are combined by the computing device to create combined data. The computing device provides the combined data for presentation to a user.

In another aspect, a system for presenting information from a plurality of security domains is provided. The system includes a server computing device and a bridge computing device that is coupled in communication with the server computing device. The server computing device is configured to receive a request for combined data from a client computing device. The combined data includes first data provided by a first data source associated with a first security domain and second data provided by a second data source associated with a second security domain. The server computing device is also configured to transmit a first request for the first data and a second request for the second data. The bridge computing device is configured to receive the first request and the second request from the server computing device, forward the first request to the first data source based on determining that the server computing device is authorized to access the first security domain, and forward the second request to the second data source based on determining that the server computing device is authorized to access the second security domain.

In yet another aspect, one or more computer readable media having computer-executable components are provided. The components include a data communication component and a data combination component. When executed by at least one processor unit, the data communication component causes the at least one processor unit to request from a bridge component first data provided by a first data source that is associated with a first security domain, to request from the bridge component second data provided by a second data source that is associated with a second security domain, to receive the first data from the first data source, and to receive the second data from the second data source. When executed by at least one processor unit, the data combination component causes the at least one processor unit to combine the first data and the second data to create combined data.

The features, functions, and advantages that have been discussed can be achieved independently in various embodiments or may be combined in yet other embodiments further details of which can be seen with reference to the following description and drawings.

DETAILED DESCRIPTION

The described embodiments are directed to accessing data from data sources in a plurality of security domains and combining such data into a single graphical representation. Data may be accessed, transformed, and combined by a plurality of user-configurable plugin components. Further, plugin components may be provided by remote devices. For example, a data communication component that enables retrieval of data from a data source in a particular security domain may be provided for download by a server computing devices that is associated with the same security domain.

Figure 1:
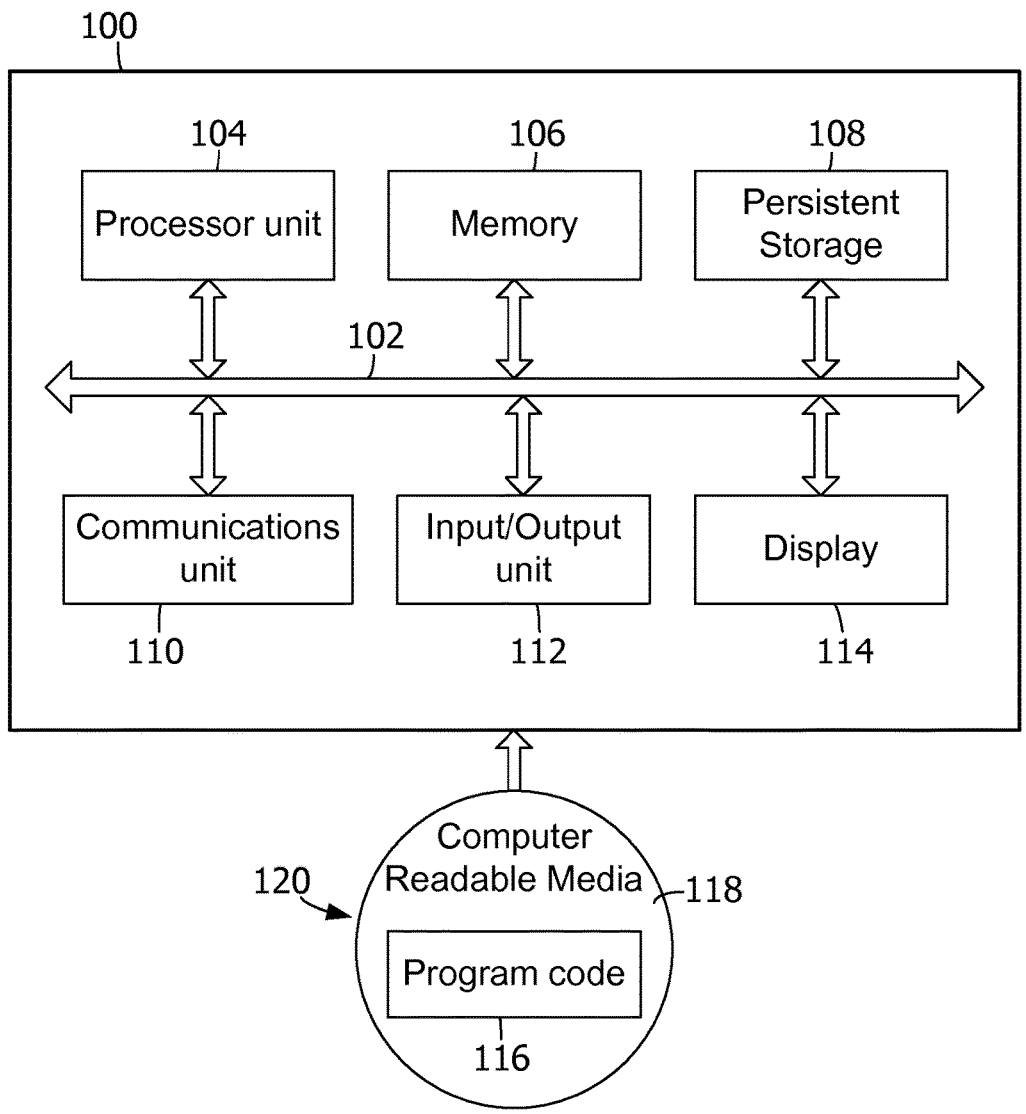
FIG. 1 is a block diagram of an exemplary computing device.

FIG. 1 is a block diagram of an exemplary computing device 100. In the exemplary embodiment, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., communication components and/or transformation components), data received from data sources, user profiles, and/or any other information suitable for use with the methods described herein.

Communications unit 110, in these examples, provides for communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include a container component, plugin components (e.g., communication components, transformation components, and/or combination components), a visualization component, a cross-domain guard component, a proxy component, and/or any component suitable for the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
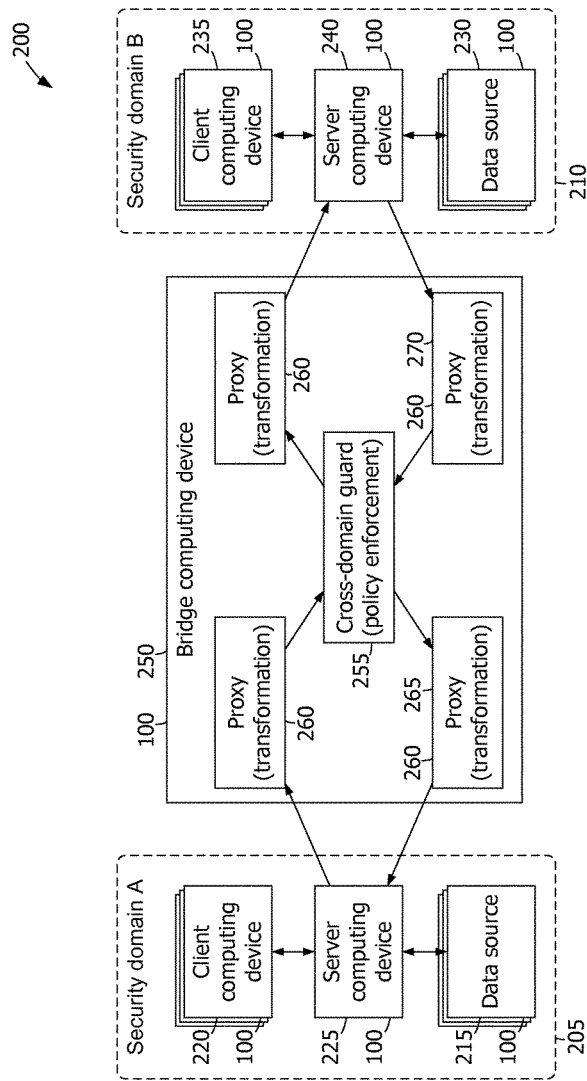
FIG. 2 is a block diagram illustrating an exemplary system for use in presenting information from a plurality of security domains.

FIG. 2 is a block diagram illustrating an exemplary system 200 for use in presenting information from a plurality of security domains. System 200 includes a first security domain 205 and a second security domain 210. First security domain 205 includes a plurality of first data sources 215, a plurality of first client computing devices 220, and a first server computing device 225. Second security domain 210 includes a plurality of second data sources 230, a plurality of second client computing devices 235, and a second server computing device 240. Data sources 215, 230, bridge computing device 250, client computing devices 220, 235, and server computing devices 225, 240 may be separate examples of computing device 100 (shown in FIG. 1) and/or may be integrated with each other.

Data sources 215, 230 include web servers, application servers, database servers, web service providers, Really Simple Syndication (RSS) feed servers, and/or any provider of data that may be used with the methods described herein. First client computing devices 220 access first data sources 215 via first server computing device 225. In exemplary embodiments, first server computing device 225 provides plugin communication components that retrieve data from first data sources 215, as described in more detail below with reference to FIG. 3. First server computing device 225 communicates with first client computing devices 220 and first data sources 215 using one or more networks, sub-networks, and/or virtual private networks (not shown).

In exemplary embodiments, first security domain 205 and second security domain 210 are each associated with a security classification. For example, security classifications may include government-designated security levels, such as top secret, secret, confidential, restricted, and/or unclassified. In addition, or alternative to, security classifications may include any designation of an access restriction by any entity.

In some scenarios, the user of a first client computing device 220 may desire data provided by a second data source 230 in second security domain 210. However, in an exemplary embodiment, first security domain 205 and second security domain 210 are associated with different security classifications. Accordingly, first client computing device 220 and first server computing device 225 cannot directly access second data source 230. Similarly, first security domain 205 and second security domain 210 may not simply be coupled, such as with a router, without undermining the security classification system.

In exemplary embodiments, system 200 includes a bridge computing device 250 that is coupled in communication with both first security domain 205 and second security domain 210. More specifically, bridge computing device 250 may be coupled in communication with first server computing device 225 and second server computing device 240, such that bridge computing device 250 is capable of transmitting data from first server computing device 225 to second server computing device 240 and vice versa. Bridge computing device 250 executes a cross-domain-guard component 255 that applies one or more security policies to such inter-domain transmissions.

In an exemplary embodiment, cross-domain guard component 255 receives a request for data that is associated with a user (e.g., the user of first client computing device 220) and a destination (e.g., second security domain 210, second server computing device 240, and/or second data source 230). Cross-domain guard component 255 includes a collection of predetermined user authorizations and determines whether the request is authorized based on the user and the destination. Accordingly, bridge computing device 250 verifies that first server computing device 225 is authorized to transmit the request to second server computing device 240.

If first server computing device 225 is so authorized, bridge computing device 250 transmits or "forwards" the request to second server computing device 240. Second server computing device 240 similarly transmits a request for data to second data source 230, receives the data, and transmits the received data to bridge computing device 250.

Cross-domain guard component 255 may also verify that second server computing device 240 is authorized to transmit the data to first server computing device 225 and/or that first server computing device 225 is authorized to receive the data from second server computing device 240. In one embodiment, cross-domain guard component 255 again references the list of predetermined user authorizations to determine whether the user is authorized to receive the transmission from second server computing device 240. In an alternative embodiment, when cross-domain guard component 255 forwards the request from first server computing device 225, cross-domain guard component 255 stores a record of the pending, authorized request from first server computing device 225 to second server computing device 240. When the transmission from second server computing device 240 is received, cross-domain guard component 255 determines that the transmission may be forwarded to first server computing device based on the transmission as being a response to the previous authorized request.

Cross-domain guard component 255 forwards the requested data to first server computing device 225, which may forward the data directly to first client computing device 220 or may apply one or more transformations, combinations, or other manipulations to the data prior to forwarding it to first client computing device 220, as described in more detail below with reference to FIG. 3.

Accordingly, first server computing device 225 provides data from both first security domain 205 and second security domain 210 to first client computing device 220. In addition, or alternative to, first server computing device 225 may access data from multiple other security domains, such as a third and/or fourth security domain (not shown), via bridge computing device 250.

In some embodiments, bridge computing device 250 executes one or more proxy components 260. Proxy components 260 apply transformations and/or filters to data being received and/or transmitted by cross-domain guard component 255. In exemplary embodiments, a first proxy component 265 processes data being forwarded by cross-domain guard component 255 to first server computing device 225, and a second proxy component 270 processes data being received by cross-domain guard component 255 from second server computing device 240. For example, second proxy component 270 may apply a transformation (e.g., formatting) to incoming data from second server computing device 240, such that the data is compatible with a transport mechanism used by cross-domain guard component 255 to forward the data. Similarly, first proxy component 265 may apply another transformation to the data, such that the data is compatible with first server computing device 225. In some embodiments, first proxy component 265 reverts the data to a format in which the data existed prior to being transformed by second proxy component 270.

Figure 3:
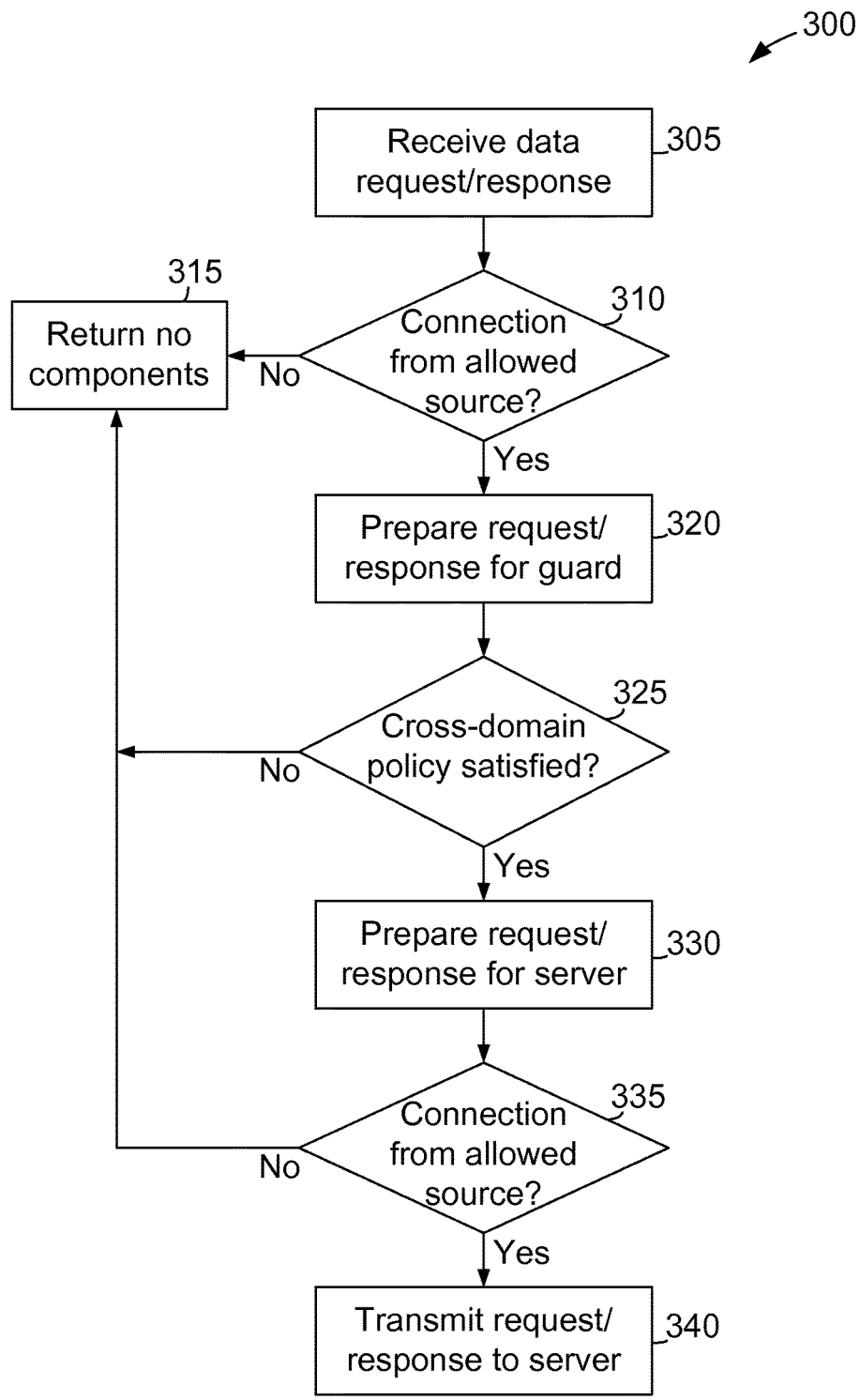
FIG. 3 is a flowchart of an exemplary method for transmitting data between security domains.

FIG. 3 is a flowchart of an exemplary method 300 for transmitting data between security domains. Referring to FIGS. 2 and 3, in exemplary embodiments, method 300 is performed by bridge computing device 250. Bridge computing device 250 receives 305 a request for data from first server computing device 225. Bridge computing device 250 determines 310 whether the connection from first server computing device 225 is associated with an authorized or allowed source with respect to first security domain 205. For example, bridge computing device 250 may compare the user, first client computing device 220, and/or first server computing device 225 to a list of users and/or computing devices that are authorized to transmit requests or other data outside first security domain 205 and/or to second security domain 210. If the connection is not associated with an authorized source, bridge computing device 250 returns 315 no data components to first server computing device 225.

If the connection is associated with an authorized source, bridge computing device 250 prepares 320 the request for cross-domain guard component 255. For example, a proxy component 260 may format the request for cross-domain guard component 255. Cross-domain guard component 255 determines 325 whether one or more cross-domain policies are satisfied. Cross-domain policies may include, but are not limited to only including, restrictions on the types of data (e.g., file types) that may be transmitted into or out of first security domain 205 and/or second security domain 210. If the policies are not satisfied, bridge computing device 250 returns 315 no data components to first server computing device 225.

If the policies are satisfied, bridge computing device 250 prepares 330 the request for second server computing device 240, such as with a proxy component 260. Bridge computing device 250 determines 335 whether the connection from first server computing device 225 is associated with an authorized or allowed source with respect to second security domain 210. For example, bridge computing device 250 may compare the user, first client computing device 220, and/or first server computing device 225 to a list of users and/or computing devices that are authorized to transmit requests or other data into second security domain 210. If the connection is not authorized, bridge computing device 250 returns 315 no data components to first server computing device 225.

If the connection is authorized, bridge computing device 250 transmits 340 the request to second server computing device 240. Second server computing device 240 retrieves the requested data and transmits a response to bridge computing device 250. In an exemplary embodiment, bridge computing device 250 performs method 300 with respect to the response from second server computing device 240. For example, bridge computing device 250 receives 305 the response and determines 310 whether the connection from second server computing device 240 is associated with an authorized or allowed source with respect to second security domain 210. If all verifications of the response are successful, bridge computing device 250 transmits 340 the response to first server computing device 225.

Figure 4:
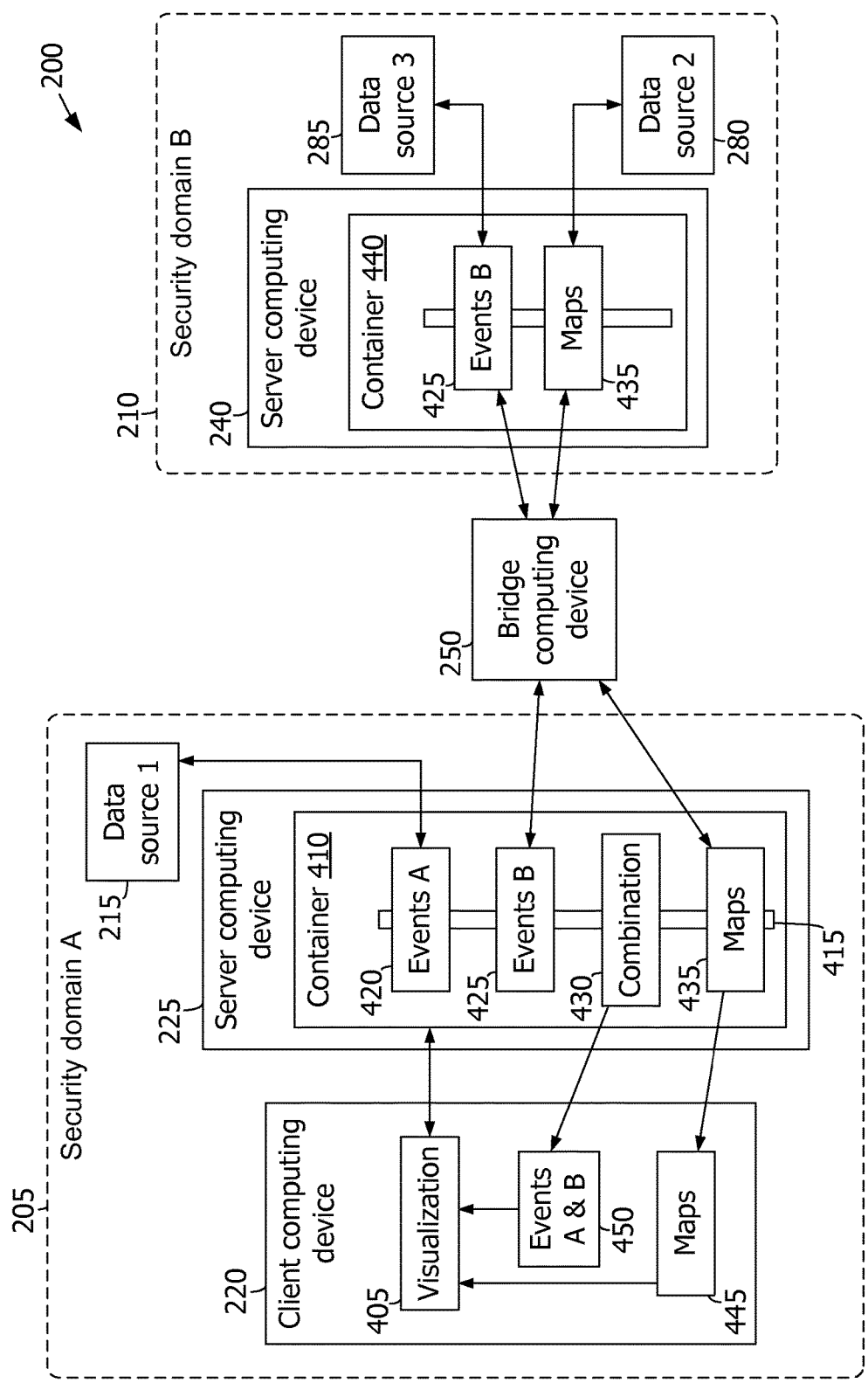
FIG. 4 is a block diagram illustrating executable components in exemplary server computing devices that may be used with the system shown in FIG. 2.
Figure 5:
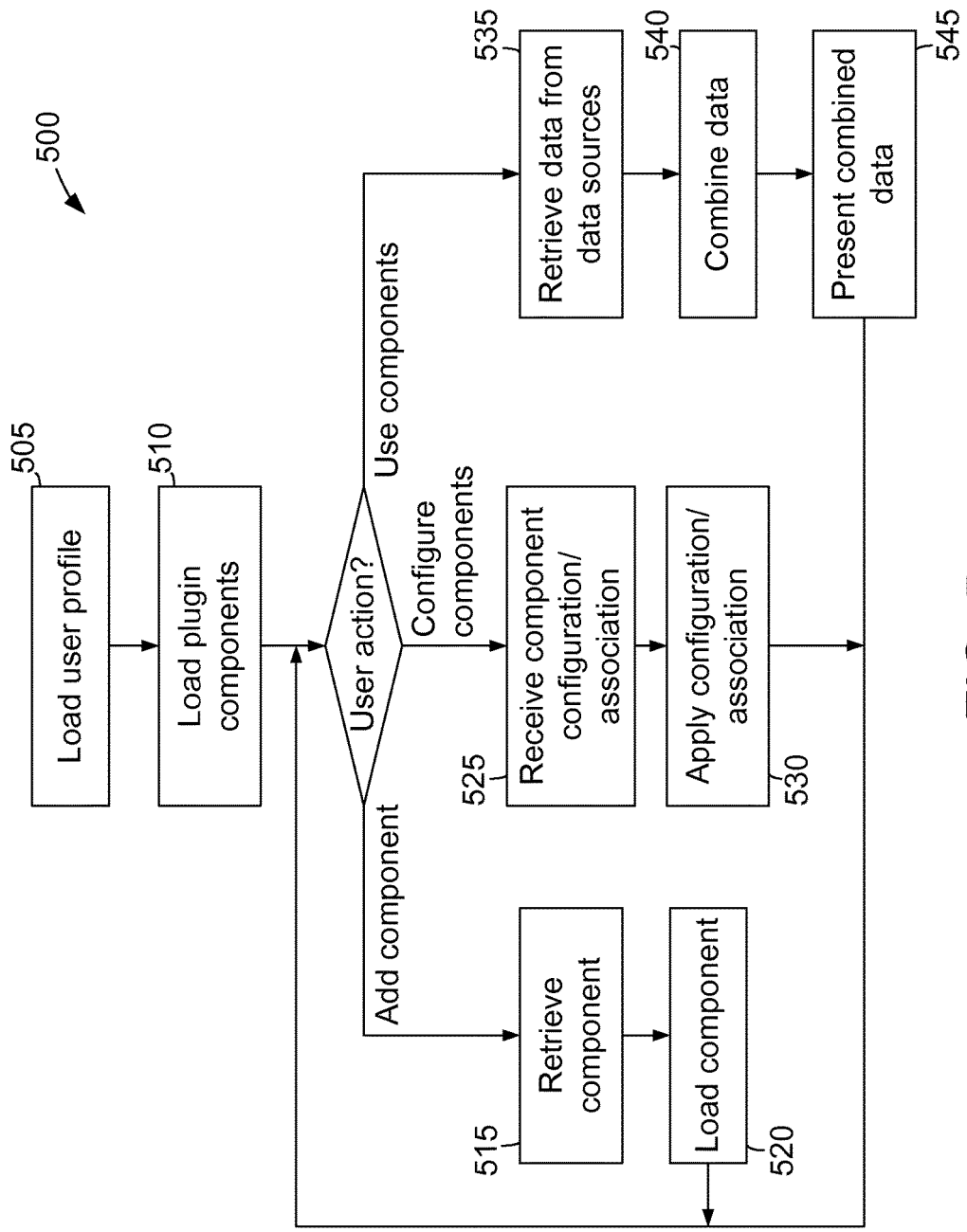
FIG. 5 is a flowchart of an exemplary method for use in presenting information from a plurality of security domains to a user.

FIG. 4 is a block diagram illustrating executable components in exemplary server computing devices that may be used with system 200 (shown in FIG. 2). FIG. 5 is a flowchart of an exemplary method 500 for use in presenting information from a plurality of security domains to a user. In exemplary embodiments, one or more operations included in method 500 are performed by a computing device 100 (shown in FIG. 1), such as first client computing device 220 and/or first server computing device 225.

Referring to FIGS. 4 and 5, in an exemplary embodiment, first client computing device executes a visualization component 405 that presents graphical representations of data, such as maps, charts, and/or graphs. Upon initialization, visualization component 405 communicates with a container component 410 executed by first server computing device 225. Container component 410 loads 505 a user profile that is associated with the user of first client computing device 220. The user profile includes an identity of the user and a collection of executable plugin components that have previously been selected for use by the user.

The executable components are referred to as "plugin" components because such components are designed to be added and/or removed from computing devices 100 in a modular fashion. For example, in exemplary embodiments, container component 410 defines an application programming interface (API). By using data structures and function definitions included in the API, plugin components may interact with container component 410 and/or other plugin components. For example, a plugin component may register with container component 410 using the API to be notified of events or data produced by another plugin component and/or to publish events or other data. In an exemplary embodiment, container component 410 includes a data bus 415. Through the API, plugin components may publish signals and/or messages to data bus 415 and/or register to receive signals and/or messages from data bus 415.

Plugin components include, but are not limited to only including, communication components that retrieve data from a data source and/or transmit data to a remote device, transformation components that transform or filter data from one form of expression to another, and/or combination components that combine data from other plugin components. Data may be communicated between plugin components via data bus 415.

Container component 410 loads 510 the plugin components included in the user profile. In the exemplary embodiment, the user profile includes a first events communication component 420 and a second events communication component 425, which are loaded 510 by container component 410. First events communication component 420 retrieves events from first data source 215, and second events communication component 425 retrieves events from a second data source 280, as described in more detail below. Data retrieved and/or produced by plugin components in container component 410 are available for presentation by visualization component 405, as described in more detail below.

The user interacts with visualization component 405, such as by electing an option. For example, visualization component 405 may prompt the user to elect an action from a collection of actions including adding a plugin component, configuring plugin components, and using plugin components.

When the user elects to add a plugin component, visualization component 405 transmits to container component 410 a request to add the plugin component. The request may include an identifier associated with the plugin component, a location of the plugin component (e.g., second server computing device 240), and/or the identity of the user. In the exemplary embodiment, the user elects to add a combination component 430 and a maps communication component 435.

Container component 410 retrieves 515 and loads (e.g., activates and/or executes) 520 the requested plugin components. If container component 410 already includes a requested component (e.g., in memory, but not loaded for the user), container component 410 retrieves 515 the requested component from memory and loads 520 the requested component. In the exemplary embodiment, container component 410 already includes combination component 430. Accordingly, container component 410 proceeds to retrieve 515 and load 520 combination component 430.

If container component 410 does not include a requested component, such as maps communication component 435, container component 410 retrieves 515 the requested component by downloading the component from a server that corresponds to (e.g., hosts) the requested component. In the exemplary embodiment, container component 410 does not include maps communication component 435, and maps communication component 435 is hosted by second server computing device 240 (e.g., by a container component 440 executed by second server computing device 240).

As described above with reference to FIGS. 2 and 3, bridge computing device 250 facilitates restricted communication between first security domain 205 and second security domain 210. Accordingly, container component 410 is able to request and retrieve 515 maps communication component 435 from second server computing device 240. In an exemplary embodiment, container component 410 provides the identity of the user to bridge computing device 250, and bridge computing device 250 determines 310 (shown in FIG. 3) that the request for maps communication component 435 is authorized based at least in part on the identity of the user.

Second server computing device 240 transmits maps communication component 435 to first server computing device 225 via bridge computing device 250. Container component 410 loads 520 the downloaded component. Accordingly, in the exemplary embodiment, container component 410 retrieves 515 maps communication component 435 from second server computing device 240 and then loads 520 maps communication component 435.

When the user elects to configure plugin components, container component 410 receives 525 a configuration of a plugin component and/or an association between two or more plugin components. A communication component configuration may include, for example, parameters such as the data source from which to retrieve data, a time at which to retrieve the data, and/or a frequency with which to retrieve the data. In the exemplary embodiment, first events communication component 420 is configured to retrieve data from first data source 215, maps communication component 435 is configured to retrieve data from second data source 280, and second events communication component 425 is configured to retrieve data from a third data source 285. A transformation component configuration may specify behavior of the transformation component such as reformatting text and/or converting units of measurement. A combination component configuration may specify a combination method, such as intermingling input messages, combining messages from multiple sources into single objects (e.g., based on similar fields, such as timestamps that vary by less than a predetermined duration), or combining messages from multiple sources into a hierarchy of objects. In addition, or alternative to, a combination component configuration may indicate whether to include a designation of the source of each message in the combined output.

A component association defines a relationship between two or more plugin components. For example, an association may define the output of one plugin component as the input of another plugin component. In an exemplary embodiment, container component 410 receives 525 from visualization component 405 an association of first events communication component 420 and second events communication component 425 with combination component 430. Specifically, the association defines the output of both first events communication component 420 and second events communication component 425 as the input of combination component 430.

Container component 410 applies 530 the received configuration or association. For example, in the exemplary embodiment, container component 410 configures combination component 430 to be notified of messages published to data bus 415 by first events communication component 420 and second events communication component 425. Combination component 430 receives such messages and combines 540 the messages into a single, combined data stream, as described in more detail below.

When the user elects to use the plugin components, visualization component 405 transmits to container component 410 a request for combined data, and container component 410 retrieves 535 data using any communication components that have been loaded 510, 520. In the exemplary embodiment, first events communication component 420 and second events communication component 425 retrieve event data from first data source 215 and third data source 285, respectively, and maps communication component 435 retrieves map data from second data source 280.

More specifically, in the exemplary embodiment, using the connection provided by bridge computing device 250, the instance of maps communication component 435 executed by first server computing device 225 is capable of transmitting a request for map data to second data source 280, to second server computing device 240, and/or to an instance of maps communication component 435 that is executed by container component 440 of second server computing device 240. In some embodiments, second server computing device 240 and/or the instance of maps communication component 435 executed by second server computing device 240 forwards the request to second data source 280.

Second data source 280 transmits the requested the map data to the instance of maps communication component 435 executed by first server computing device 225 via bridge computing device, and, optionally, via second server computing device 240 and/or the instance of maps communication component 435 executed by second server computing device 240.

In one embodiment, second server computing device 240 executes an instance of maps communication component 435, which receives requests for map data from (e.g., via bridge device 250 and/or from second client computing device 235, shown in FIG. 2) and, in response, returns data received from second data source 280. Further, as described above, second server computing device 240 provides maps communication component 435 for download, such that other computing devices 100 (shown in FIG. 1) may retrieve 515 and load 520 another instance of maps communication component 435.

Similarly, second events communication component 425 retrieves 535 event data from third data source 285 via bridge computing device and, optionally, via second server computing device 240 and/or the instance of second events communication component 425 executed by second server computing device 240.

Maps communication component 435 provides map data 445 to first client computing device 220 for use by visualization component 405. The event data retrieved 535 by first events communication component 420 and the data retrieved 535 by second events communication component 425 are combined 540 by combination component 430 to create combined data. The combined event data 450 is transmitted to first client computing device 220 for use by visualization component 405.

Visualization component 405 further combines 540 map data 445 and combined event data 450, creating a graphical representation of the combined data. Visualization component 405 presents 545 the graphical representation, such that a user may view information integrated from multiple data sources associated with multiple security domains.

While particular examples of data retrieval and presentation are described above, container 410 may include any number of communication components, transform components, and/or combination components and may access data from any number of data sources in any number of security domains.

Figure 6:
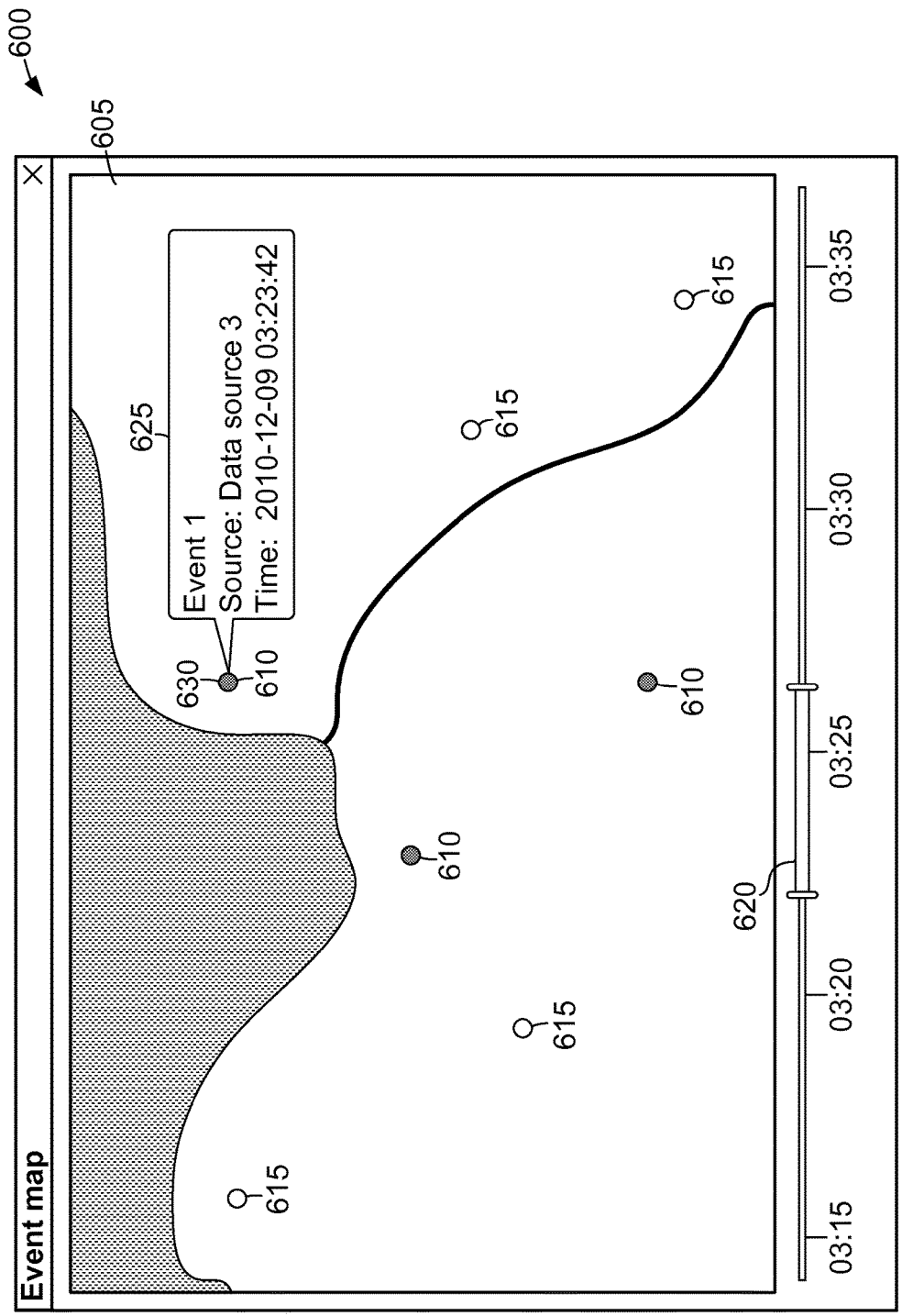
FIG. 6 is an exemplary user interface including information from a plurality of security domains.

FIG. 6 is an exemplary user interface 600 including information from a plurality of security domains. In an exemplary embodiment, user interface 600 is a graphical representation of events presented by visualization component 405 at first client computing device 220 and depicts a plurality of events based on geographic positions and times corresponding to the events.

Referring to FIGS. 4 and 6, user interface 600 includes a map 605 that is based on map data 445. Overlaid on map 605 are events, including first events 610 from first data source 215 and second events 615 from third data source 285. In the exemplary embodiment, first events 610 are graphically distinguished from second events 615 by shading. In addition, or alternative to, graphical distinction may be accomplished by applying a pattern (e.g., a line pattern or a background pattern), a color (e.g., a background color or a foreground color), a line weight, a typeface, a font weight, an animation (e.g., fading and/or blinking), a proximately positioned icon, and/or any other suitable means for distinguishing graphical elements from one another. In an alternative embodiment, presented data are not graphically distinguished based on data source.

Each event 610, 615 corresponds to a geographic position (e.g., a longitude and a latitude) and a time (e.g., including a date and a time of day). Events 610, 615 are positioned within map 605 based on the corresponding geographic positions. Further, events 610, 615 may be displayed based on the corresponding times. In the exemplary embodiment, user interface 600 includes a time selector 620 that enables a user to select a start time and an end time that define a duration. User interface 600 displays on map 605 events 610, 615 that correspond to a time within the duration. Further, as the user may drags time selector 620 left or right, user interface 600 updates map 605, such that only events 610, 615 within the currently selected duration are displayed. Accordingly, the user may view a time progression of events 610, 615 from first data source 215 and third data source 285.

In the illustrated embodiment, user interface 600 also displays an event detail area 625 when the user selects an input event 610, 615. As shown in FIG. 6, event detail area 625 includes an event identifier, a data source (e.g., third data source 285), and a time that correspond to a selected event 630.

Embodiments described herein enable a user to access data from a plurality of security domains while preserving the security provided by generally preventing inter-domain access. Accordingly, entities that operate computing devices in difference security domains (e.g., local law enforcement and national security) may access data in the other entity's security domain, either unidirectionally or bidirectionally. Further, the embodiments provided facilitate such sharing of data without requiring periodic duplication of data from one security domain to another. As such, such embodiments facilitate providing inter-domain access to current data without significantly increasing storage costs. In addition, users may easily add and configure plugin components in a container component, such that data from multiple data sources may be combined and presented to the user, regardless of which security domain the data sources are associated with.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for presenting information from a plurality of security domains, said method comprising:
receiving, by a computing device, a first request for a first communication component provided by a first server in a first security domain that is associated with a first security classification;
receiving, by the computing device, a second request for a second communication component provided by a second server in a second security domain that is associated with a second security classification comprising a restriction level that is different than the first security classification, wherein the first server is unable to access the second server and the second server is unable to access the first server due to the difference in security classifications;
determining whether the first server is authorized to access the first security domain;
determining whether the second server is authorized to access the second security domain;
based on the determination that the first server is authorized to access the first security domain and that the second server is authorized to access the second security domain, said method comprises:
forwarding the first request to the first server;
forwarding the second request to the second server;
combining, by the computing device, first data received from the first server via the first communication component and second data received from the second server via the second communication component to create combined data; and
providing, by the computing device, the combined data for presentation to a user; and
based on the determination that at least one of the first server is not authorized to access the first security domain and that the second server is not authorized to access the second security domain, returning neither the first data nor the second data.

2. A method in accordance with claim 1, wherein the computing device is associated with the first security domain, said method further comprising:
requesting the second data from the second server via a bridge device that is coupled in communication with the first security domain and the second security domain; and
receiving the second data from the second server via the bridge device.

3. A method in accordance with claim 2, further comprising:
verifying by the bridge device that the computing device is authorized to transmit a request to the second server; and
verifying by the bridge device that the computing device is authorized to receive the second data from the second server.

4. A method in accordance with claim 1, wherein receiving the first communication component comprises receiving a communication component that is configured to acquire the first data from the first server, wherein the first data is associated with a data source in the first security domain.

5. A method in accordance with claim 1, wherein the computing device is associated with the first security domain, said method further comprising providing by the computing device a third communication component to a remote computing device associated with the second security domain, wherein the third communication component is configured to acquire third data from a third data source in the first security domain.

6. A method in accordance with claim 1, wherein combining the first data and the second data comprises creating a single graphical representation of the first data and the second data.

7. A method in accordance with claim 1, wherein the first data includes first events corresponding to geographic positions, the second data includes second events corresponding to geographic positions, and combining the first data and the second data comprises creating a map depicting the first events and the second events based on the corresponding geographic positions.

8. A system for presenting information from a plurality of security domains, said system comprising:
a first server computing device configured to:
receive a request for combined data from a client computing device, wherein the combined data includes first data is provided by a first data source associated with a first security domain and second data provided by a second data source associated with a second security domain and also associated with a second server computing device, the first security domain comprising a first security classification that has a restriction level that is different than a second security classification associated with the second security domain, wherein the first server is unable to access the second server and the second server is unable to access the first server due to the difference in security classifications;
transmit a first request for the first data to a bridge computing device; and
transmit a second request for the second data to the bridge computing device; and
a bridge computing device coupled in communication with said first server computing device and the second server computing device and configured to:
receive the first request and the second request from the first server computing device;
determine whether the first server computing device is authorized to access the first security domain;
determine whether the second server computing device is authorized to access the second security domain;
based on the determination that the first server computing device is authorized to access the first security domain and that the second server computing device is authorized to access the second security domain, said bridge computing device is configured to:
forward the first request to the first data source;
forward the second request to the second data source; and
combine the first data retrieved from the first data source and the second data retrieved from the second data source; and
based on the determination that at least one of the first server computing device is not authorized to access the first security domain and that the second server computing device is not authorized to access the second security domain, said bridge computing device is configured to return neither the first data nor the second data.

9. A system in accordance with claim 8, wherein said first server computing device is further configured to:
receive the first data from the first data source and the second data from the second data source via said bridge computing device;
combine the first data and the second data to create the combined data; and
transmit the combined data to the client computing device.

10. A system in accordance with claim 9, wherein said first server computing device is configured to create the combined data at least in part by creating a single graphical representation of the first data and the second data.

11. A system in accordance with claim 9, further comprising the client computing device, wherein the client computing device is configured to:
create a single graphical representation of the combined data; and
display the graphical representation of the combined data.

12. A system in accordance with claim 8, wherein said first server computing device is configured to:
retrieve the first data using a first communication component received from the first security domain via said bridge computing device; and
retrieve the second data using a second communication component received from the second security domain via said bridge computing device.

13. A system in accordance with claim 12, wherein the first communication component publishes the first data to a data bus, the second communication component publishes the second data to the data bus, and said first server computing device is further configured to:
receive from the client computing device a selection of a combination component that combines data published to the data bus by a plurality of communication components;
receive from the client computing device an association of the first communication component and the second communication component with the combination component; and
combine the first data and the second data at least in part by receiving the first data and the second data by the combination component via the data bus.

14. A system in accordance with claim 12, wherein said first server computing device is further configured to:
receive from the client computing device an association of the first communication component with a transformation component that transforms data from a first form of expression to a second form of expression;
transform the first data by the transformation component to create transformed first data; and
combine the first data and the second data by combining the transformed first data and the second data.

15. A system in accordance with claim 8, wherein said bridge computing device is further configured to:
receive the first data from the first data source and the second data from the second data source;
forward the first data to said first server computing device based on determining that the first data source is authorized to transmit the first data to said first server computing device; and
forward the second data to said first server computing device based on determining that the second data source is authorized to transmit the second data to said first server computing device.

16. One or more non-transitory computer readable media having computer-executable components, said components comprising:
   a bridge component that when executed by at least one processor unit causes the at least one processor unit to:
      receive a request for first data provided by a first data source that is associated with a first security domain;
      receive a request for second data provided by a second data source that is associated with a second security domain, the first security domain comprising a first security classification that has a restriction level that is different than a second security classification associated with the second security domain, wherein the first server is unable to access the second server and the second server is unable to access the first server due to the difference in security classifications;
      determine whether the first server is authorized to access the first security domain;
      determine whether the second server is authorized to access the second security domain;
      based on the determination that the first server is authorized to access the first security domain and that the second server is authorized to access the second security domain, said bridge component is configured to:
         forward the request for the first data to the first data source;
         forward the request for the second data to the second data source;
         receive the first data from the first data source; and
         receive the second data from the second data source; and
      a data combination component that when executed by at least one processor unit causes the at least one processor unit to combine the first data and the second data to create combined data; and
      based on the determination that at least one of the first server computing device is not authorized to access the first security domain and that the second server computing device is not authorized to access the second security domain, said bridge computing device is configured to return neither the first data nor the second data.

17. One or more non-transitory computer readable media in accordance with claim 16, wherein when executed by at least one processor unit, said bridge component causes the at least one processor unit to transmit the first data to a data communication component based on determining that the computing device is authorized to access the first security domain.

18. One or more non-transitory computer readable media in accordance with claim 16, wherein said bridge component includes a first communication component associated with the first data and a second communication component associated with the second data, and said bridge component further causes the at least one processor unit to:
   receive the first communication component from the first security domain; and
   receive the second communication component from the second security domain.

19. One or more non-transitory computer readable media in accordance with claim 16, wherein said computer-executable components further comprise a data visualization component that when executed by at least one processor causes the at least one processor unit to create a single graphical representation of the combined data.

20. One or more non-transitory computer readable media in accordance with claim 16, wherein the first data and the second data include a plurality of events, each event of the plurality of events corresponds to a geographic position and a time, and said data visualization component further causes the at least one processor unit to create a map depicting the events based on the corresponding geographic positions and times.

* * * * *